(12) United States Patent
Wang et al.

(10) Patent No.: US 8,069,534 B2
(45) Date of Patent: Dec. 6, 2011

(54) HINGE ASSEMBLY

(75) Inventors: Jin-Xin Wang, Shenzhen (CN); Chao-Zhong Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 450 days.

(21) Appl. No.: 12/344,671

(22) Filed: Dec. 29, 2008

(65) Prior Publication Data

US 2010/0050386 A1    Mar. 4, 2010

(30) Foreign Application Priority Data

Sep. 3, 2008  (CN) .......................... 2008 1 0304352

(51) Int. Cl.
*E05D 11/08* (2006.01)
(52) U.S. Cl. ................ 16/340; 16/330; 16/374
(58) Field of Classification Search ............ 16/337–339, 16/342, 330, 303, 374, 376, 377, 340, 355, 16/239, 357, 360, 361, 362, 367; 361/679.06, 361/679.07, 679.08, 679.12, 679.27; 455/90.3, 455/575.1, 575.3, 575.8; 379/433.12, 433.13; 348/373, 333.01, 333.06, 794
See application file for complete search history.

(56) References Cited

U.S. PATENT DOCUMENTS

| | | | | |
|---|---|---|---|---|
| 5,109,570 | A * | 5/1992 | Okada et al. ................... | 16/289 |
| 5,269,047 | A * | 12/1993 | Lu ................................ | 16/340 |
| 5,913,351 | A * | 6/1999 | Miura ............................ | 16/340 |
| 6,125,507 | A * | 10/2000 | Katoh ............................ | 16/329 |
| 6,539,582 | B1 * | 4/2003 | Chae ............................. | 16/340 |
| 6,568,034 | B2 * | 5/2003 | Cho .............................. | 16/337 |
| 6,618,903 | B2 * | 9/2003 | Kim .............................. | 16/337 |
| 6,862,779 | B1 * | 3/2005 | Lu et al. ........................ | 16/340 |
| 7,082,642 | B2 * | 8/2006 | Su ................................ | 16/340 |
| 7,603,747 | B2 * | 10/2009 | Ho et al. ........................ | 16/330 |
| 2004/0093690 | A1 * | 5/2004 | Lu et al. ........................ | 16/330 |
| 2007/0136992 | A1 * | 6/2007 | Lu et al. ........................ | 16/330 |
| 2007/0169312 | A1 * | 7/2007 | Ho et al. ........................ | 16/330 |

FOREIGN PATENT DOCUMENTS

| | | |
|---|---|---|
| CN | 2545419 Y | 4/2003 |
| CN | 100370156 C | 2/2008 |

* cited by examiner

*Primary Examiner* — Chuck Y. Mah
(74) *Attorney, Agent, or Firm* — Altis Law Group, Inc.

(57) ABSTRACT

A hinge assembly includes a shaft, a leaf, a rotatable joint, a positioning member, an elastic engaging member, and a fastening member. The leaf is non-rotatably mounted on the shaft, and the rotatable joint is rotatably mounted on the shaft. The positioning member includes an engaging surface, and is non-rotatable relative to the rotatable joint. The elastic engaging member includes an engaging surface, and is non-rotatably sleeved on the shaft. The fastening member is engaged on the shaft. One of the engaging surfaces of the positioning member and the engaging member forms an engaging protrusion, and the other one of the engaging surfaces of the positioning member and the engaging member defines an engaging slot engaging with the engaging protrusion.

14 Claims, 4 Drawing Sheets

HINGE ASSEMBLY

BACKGROUND

1. Field of the Invention

The present disclosure generally relates to hinge assemblies and, particularly, to a hinge assembly used in a foldable electronic device having a top cover and a main body.

2. Description of the Related Art

Foldable electronic devices, such as notebook computers, are popular for their portability. In the foldable electronic device, a cover is rotatably connected to a main body via a typical hinge assembly.

The typical hinge assembly often includes a shaft, a rotary bracket, a fixed bracket, a cam, a cam follower, a plurality of friction members, and a resilient member. The rotary bracket, the fixed bracket, the cam, the cam follower, the friction members, and the resilient member are sleeved on the shaft. The cam forms two peaks, and the cam follower defines two valleys for engaging with the peaks. The cam and the cam follower resist each other caused by forces of the resilient member. When the peaks of the cam engage in the valleys of the cam follower, the rotary bracket is positioned at desired positions relative to the fixed bracket.

However, the cam and the cam follower are usually made of powder metallurgy alloy steels having high rigidity and made by injecting powder metallurgy alloy. The material and injecting process are costly. Thus, the hinge assembly has a relatively high cost.

Therefore, a new hinge assembly is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

Figure 1:
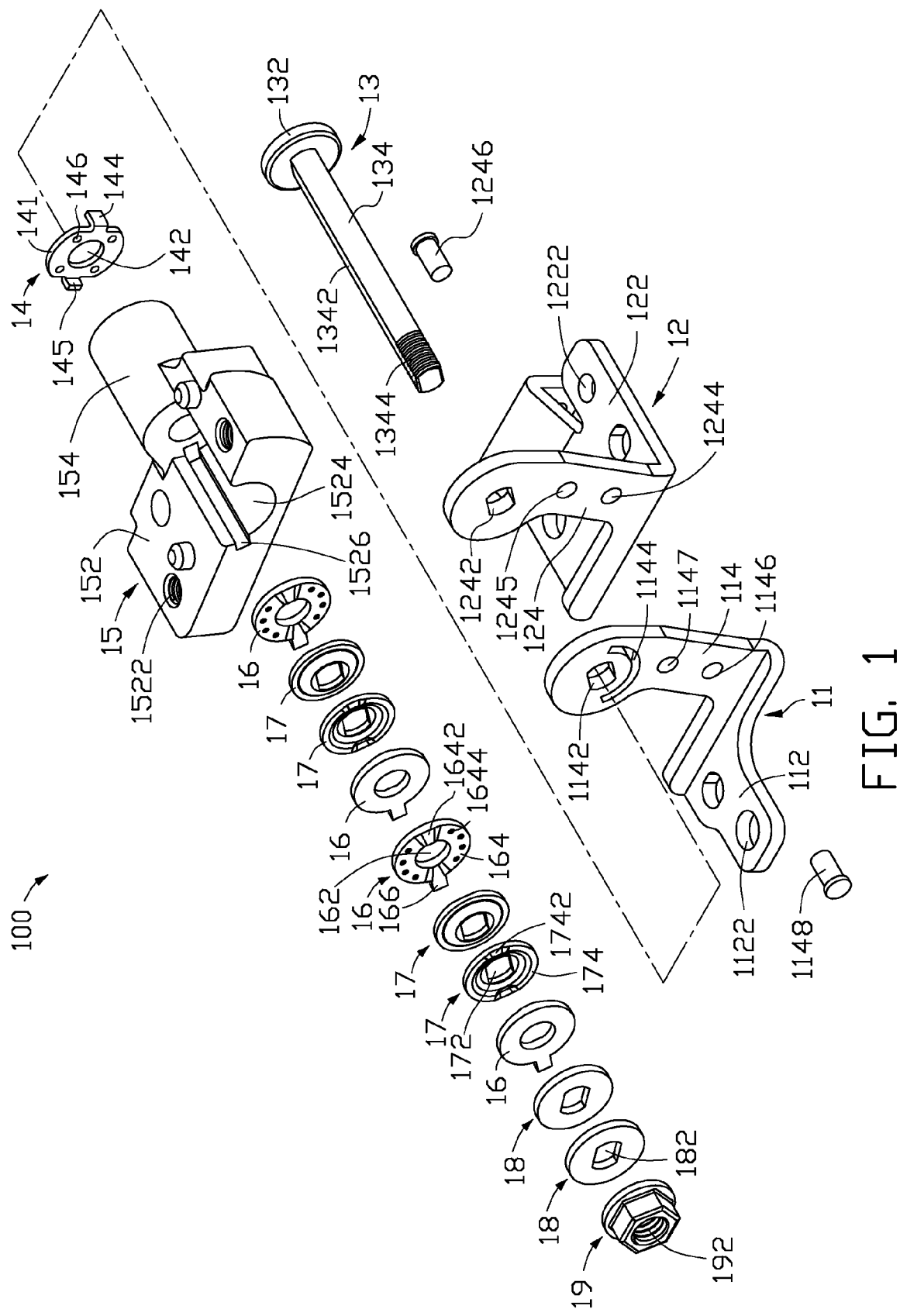
FIG. 1 is an exploded, isometric view of one embodiment of a hinge assembly.
Figure 2:
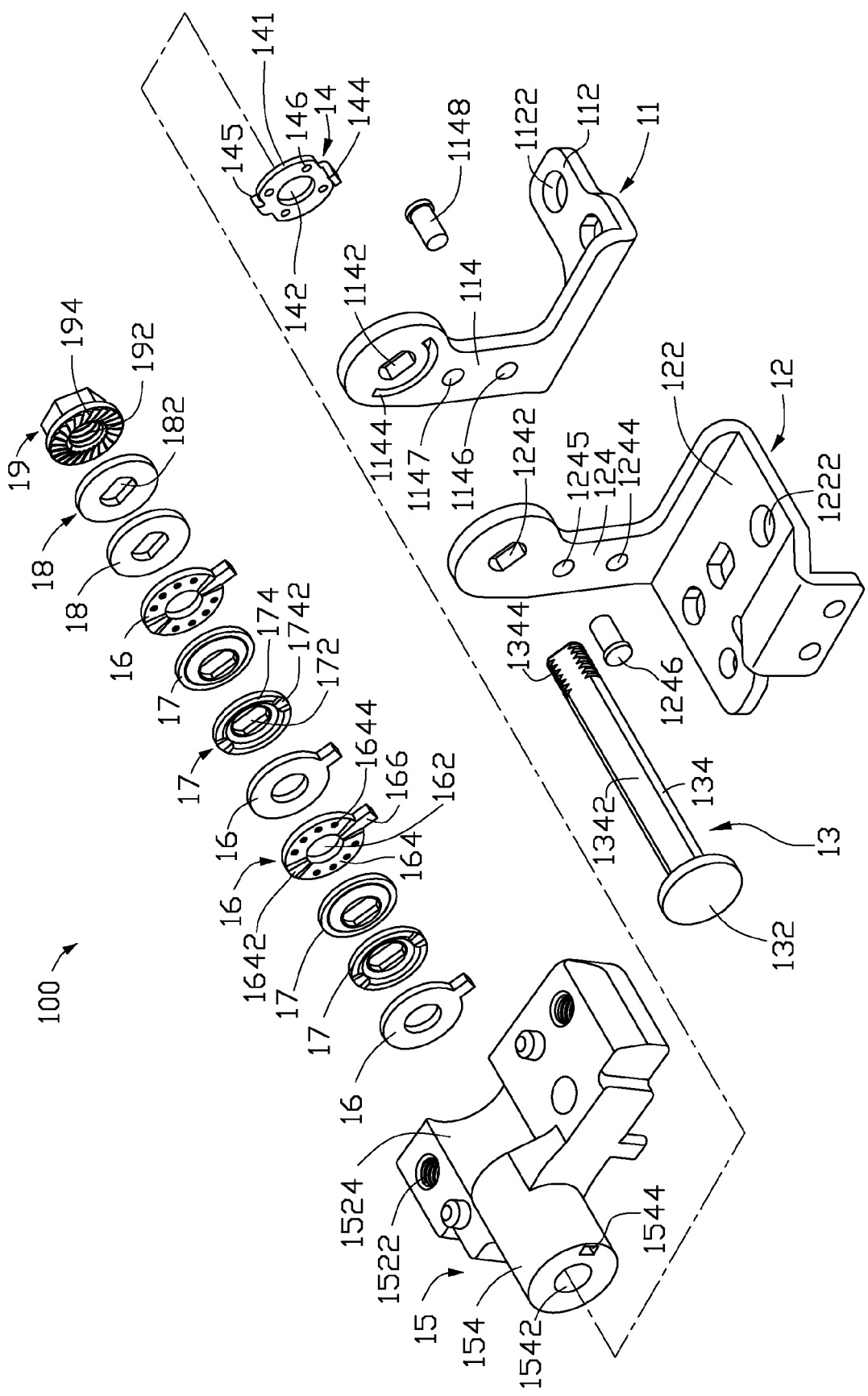
FIG. 2 is similar to FIG. 1, but viewed from another aspect.

The present hinge assembly may be used in foldable electronic devices, such as notebook computers, cell phones, media players, and so on. Referring to FIG. 1, an embodiment of a hinge assembly 100 includes a first leaf 11, a second leaf 12, a pivot shaft 13, a tab washer 14, a rotatable joint 15, a positioning member 16, an elastic engaging member 17, a friction member 18, and a fastening member 19. In the illustrated embodiment, there are four positioning members 16, four engaging members 17, and two friction members 18. The first and second fixing brackets 11, 12 are non-rotatably sleeved on the shaft 13, and the rotatable joint 15 is rotatably sleeved on the shaft 13.

The first leaf 11 includes a mounting portion 112 and a joint portion 114 substantially perpendicularly formed from an edge of the mounting portion 112. The mounting portion 112 and the connecting portion 114 are substantially flat pieces. The mounting portion 112 defines a fixing hole 1122. The first leaf 11 may be fixed to a main body of an electronic device (not shown) such as by inserting a screw in the fixing hole 1122 and a threaded hole of the main body. The connecting portion 114 defines a non-circular engaging hole 1142 and a limiting arced slot 1144 sharing a center with the engaging hole 1142. The connecting portion 114 further defines a first pinhole 1146 and a second pinhole 1147.

The second leaf 12 includes a mounting portion 122 and a connecting portion 124 substantially perpendicularly formed from an edge of the mounting portion 122. The mounting portion 122 and the connecting portion 124 are substantially flat pieces. The mounting portion 122 defines a fixing hole 1222. The second leaf 12 may be fixed to the main body such as by inserting a screw in the fixing hole 1222 and engaging the screw with a threaded hole of the main body. The connecting portion 124 defines a non-circular engaging hole 1242 corresponding to the engaging hole 1142 of the first leaf 11. The connecting portion 124 further defines a third pinhole 1244 and a fourth pinhole 1245. The hinge assembly 100 further includes a first pin 1148 engaging in the first pinhole 1146 and the third pinhole 1245, and a second pin 1246 engaging in the second pinhole 1147 and the fourth pinhole 124, thus fixedly connecting the first leaf 11 and second leaf 12.

The shaft 13 includes a cap 132 and a shaft portion 134. The cap 132 is formed at an end of the shaft portion 134 and has a diameter larger than a diameter of the shaft portion 134. The shaft portion 134 may be a non-circular column having a cross-section corresponding to a shape of the engaging holes 1142, 1242. The shaft portion 134 has two flattened surfaces 1342. The shaft portion 134 further forms a screw thread 1344 at an end opposite to the cap 132.

The tab washer 14 is approximately ring shaped. The tab washer 14 includes a ring portion 141, a first bent tab 144, and a second bent tab 145. The first bent tab 144 and the second bent tab 145 are substantially perpendicularly and symmetrically formed from a periphery of the ring portion 141, and extending in opposite directions. The ring portion 141 defines a central hole 142 and a plurality of oil holes 146 surrounding the central hole 142.

The rotatable joint 15 includes a fixing portion 152 and a connecting portion 154. The connecting portion 154 is substantially cylindrical and formed at an end of the fixing portion 152. The fixing portion 152 defines a plurality of assembling holes 1522. The rotatable joint 15 may be fixed to a cover of the electronic device such as by inserting a screw in each assembling hole 1522 and engaging the screw with threaded holes of the cover. The fixing portion 152 defines a substantially semi-cylindrical receiving groove 1524 aligned coaxially with the connecting portion 154. The fixing portion 152 further defines a latching slot 1526 in a sidewall defining the receiving groove 1524. The connecting portion 154 defines a through hole 1542 extending along an axis of the connecting portion 154 and a blocking slot 1544 in an end.

The positioning member 16 may be a substantially ring-shaped friction member having good wear resistance. The positioning member 16 defines a central hole 162 in a center portion. The positioning member includes an engaging surface 164. An engaging protrusion 1642 may be formed on the engaging surface 164, and a plurality of oil holes 1644 are defined on the engaging surface 164 between the engaging protrusions 1642. In the illustrated embodiment, there are two engaging protrusions 1642 symmetrically formed on the engaging surface 164. The positioning member 16 forms a blocking protrusion 166 at a periphery.

The engaging member 17 may be a substantially disk-shaped elastic member defining an engaging hole 172. The engaging hole 172 has a shape corresponding to that of the engaging holes 1142, 1242. The engaging member 17 includes an engaging surface 174 engaging with the engaging surface 162 of the positioning member 16. An engaging slot 1742 is defined in the engaging surface 174. In the illustrated embodiment, there are two engaging slots 1742 symmetrically defined in the engaging surface 174.

The friction member 18 is substantially ring-shaped and defines an engaging hole 182 in a center portion. The engaging hole 182 has a shape corresponding to that of the engaging holes 1142, 1242. The fastening member 19 may be a nut defining a threaded hole 192. The fastening member 19 has a friction portion 194 formed at an end.

Figure 3:
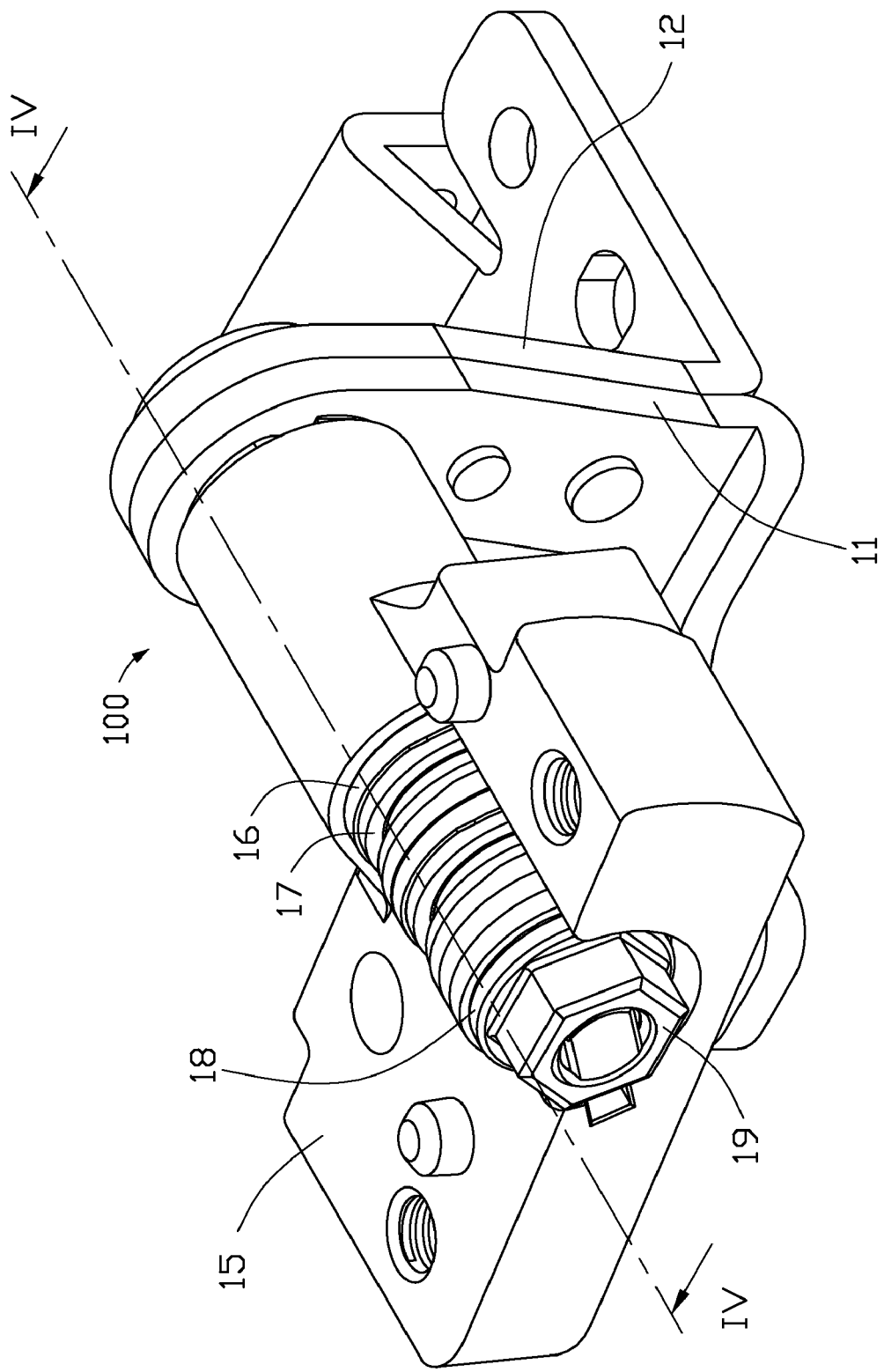
FIG. 3 is an assembled, isometric view of the hinge assembly of FIG. 1.
Figure 4:
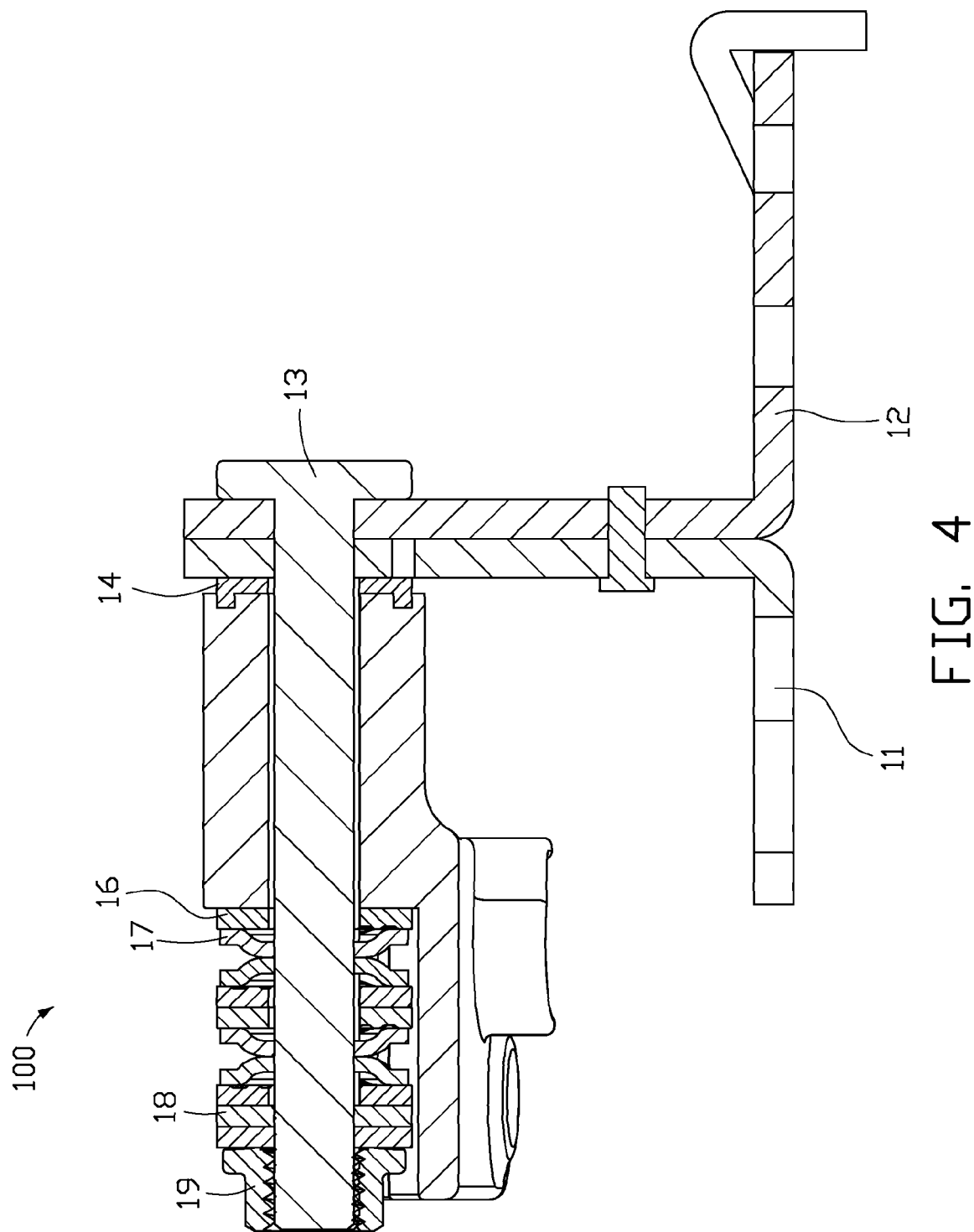
FIG. 4 is a cross-sectional view of the hinge assembly of FIG. 3, taken along line IV-IV.

Also referring to FIG. 3 and FIG. 4, the shaft portion 134 of the shaft 13 is passed through the engaging hole 1242 of the second leaf 12, the engaging hole 1142 of the first leaf 11, the central hole 142 of the tab washer 14, the extending hole 1542 of the rotatable joint 15, one positioning member 16, two engaging members 17, two positioning members 16, two engaging members 17, one positioning member 16, and the friction members 18, in that order. The fastening member 19 is screwed on the screw thread 1344 of the shaft 13. The positioning members 16 and the engaging members 17 are positioned in pairs, i.e., each positioning member 16 is positioned to engage with one corresponding engaging member 17. The positioning members 16, the engaging members 17 and the friction members 18 are received in the receiving groove 1524 of the rotatable joint 15. The blocking protrusions 166 of the positioning members 16 are non-rotatably and slidably engaged in the latching slot 1526 of the rotatable joint 15. The engaging surfaces 164 of the positioning members 16 are engaged with the engaging surfaces 174 of the engaging members 17. The first and second bent tabs 144, 145 are engaged in the limiting arced slot 1144 of the first leaf 11 and the blocking slot 1544. The first leaf 11, the second leaf 12, the shaft 13, the engaging members 17, the friction members 18, and the fastening member 19 are non-rotatable relative to each other, but rotatable relative to the rotatable joint 15, the tab washer 14, and the positioning members 16. The first and second pins 1148, 1246 may be riveted to connect the first leaf 11 and the second leaf 12.

When the cover is folded over the main body of the electronic device, the hinge assembly 100 is in a first state. In the first state, the engaging member 17 resists the positioning members 16, and the engaging slot 1742 engages with the engaging protrusion 1642 of the corresponding positioning member 16. The rotatable joint 15 is positioned in a first position relative to the first leaf 11 and the second leaf 12. When the rotatable joint 15 rotates relative to the first leaf 11 and the second leaf 12, the tab washer 14 and the engaging members 17 rotate together with the rotatable joint 15. The positioning members 16 continue to resist the engaging members 17 as the rotatable joint 15 rotates, and the first bent tab 144 of the tab washer 14 slides into the limiting arced slot 1144 of the first leaf 11. As the rotatable joint 15 rotates further, the engaging protrusions 1642 of the positioning members 16 slide out of the engaging slots 1742 of the engaging members 17 and deform the engaging members 17. A friction force is generated between the components of the hinge assembly 100. Thus, the rotatable joint 15 can be held at any position relative to the first leaf 11 and the second leaf 12. The limiting arced slot 1144 of the first leaf 11 restricts an amount that the rotatable joint 15 and the first leaf 11 and the second leaf 12 can rotate relative to each other. When the first bent tab 144 reaches an ultimate position of the limiting arced slot 1144, the rotatable joint 15 is prevented from rotating further and the rotatable joint 15 reaches a maximum opening position. A friction force between the components of the hinge assembly 100 may be adjusted by adjusting the fastening member 19 inwards or outwards.

The hinge assembly 100 does not employ any cam or cam follower which have high costs. The hinge assembly 100 can perform the positioning function with the engaging protrusions 1642 of the positioning members 16 and the engaging slots 1742 of the engaging members 17. The positioning members 16 and the engaging members 17 can be manufactured by a pressing method which is inexpensive. Therefore, the hinge assembly 100 has low cost. Alternatively, the second leaf 12 of the hinge assembly 100 may be omitted, furthering lowering material and assembly.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising:
a shaft;
a first leaf non-rotatably mounted on the shaft and defining a limiting arced slot;
a rotatable joint rotatably mounted on the shaft;
a tab washer sleeved on the shaft, and non-rotatably assembled with the rotatable joint; the tab washer comprising a first bent tab slidably engaged in the limiting arced slot of the first leaf to restrict an amount that the rotatable joint and the first leaf capable of rotating relative to each other;
a positioning member comprising an engaging surface, and non-rotatably assembled to the rotatable joint;
an elastic engaging member comprising an engaging surface, and non-rotatably sleeved on the shaft; and
a fastening member engaged on the shaft;
wherein one of the engaging surfaces of the positioning member and the engaging member forms an engaging protrusion, and the other one of the engaging surfaces of the positioning member and the engaging member defines an engaging slot engaging with the engaging protrusion.

2. The hinge assembly of claim 1, wherein the tab washer further comprises a second bent tab, the rotatable joint defines a blocking slot fixedly engaging with the second bent tab of the tab washer.

3. The hinge assembly of claim 2, wherein the tab washer is approximately a ring comprising a ring portion; the first bent tab and the second bent tab are substantially perpendicularly and oppositely located from a periphery of the ring portion and extending in opposite directions.

4. The hinge assembly of claim 1, wherein the first leaf comprises a mounting portion and a connecting portion substantially perpendicularly formed from an edge of the mounting portion, the mounting portion and the connecting portion are substantially flat sheets; the limiting arced slot is defined in the connecting portion and is arc-shaped.

5. The hinge assembly of claim 4, wherein the mounting portion defines a fixing hole; the connecting portion further defines a non-circular engaging hole substantially sharing a center with the limiting arced slot; the shaft non-rotatably passes through the engaging hole of the connecting portion.

6. The hinge assembly of claim 1, wherein the hinge assembly further comprises a second leaf non-rotatably sleeved on the shaft and fixed to the first leaf.

7. The hinge assembly of claim 6, wherein the first leaf and the second leaf each defines a pinhole; the hinge assembly further comprises a pin engaging in the pinholes.

8. The hinge assembly of claim 1, wherein the positioning member further forms a blocking protrusion at a periphery; the rotatable joint defines a latching slot extending substantially parallel to an axis of the shaft; the blocking protrusion is non-rotatably and slidably engaged in the latching slot.

9. The hinge assembly of claim 1, wherein the hinge assembly further comprises a friction member positioned between the fastening member and the positioning member.

10. A hinge assembly, comprising:

a shaft;

a first leaf non-rotatably sleeved on the shaft and defining a limiting arced slot;

a rotatable joint rotatably sleeved on the shaft;

a tab washer sleeved on the shaft, and non-rotatably assembled with the rotatable joint; the tab washer comprising a first bent tab slidably engaged in the limiting arced slot of the first leaf to restrict an amount that the rotatable joint and the first leaf capable of rotating relative to each other;

a positioning member non-rotatably assembled to the rotatable joint, the positioning member comprising an engaging surface forming one of an engaging protrusion and an engaging slot; and an elastic engaging member non-rotatably sleeved on the shaft, the engaging member comprising an engaging surface forming the other one of the engaging protrusion and the engaging slot;

wherein the positioning member and the engaging member are positioned adjacent to each other with the engaging surfaces facing each other.

11. The hinge assembly of claim 10, wherein the tab washer further comprises a second bent tab, the rotatable joint defines a blocking slot fixedly engaging with the second bent tab of the tab washer.

12. The hinge assembly of claim 11, wherein the tab washer is approximately a ring comprising a ring portion; the first bent tab and the second bent tab are substantially perpendicularly and oppositely located from a periphery of the ring portion and extending in opposite directions.

13. The hinge assembly of claim 10, wherein the first leaf comprises a mounting portion and a connecting portion substantially perpendicularly formed from an edge of the mounting portion, the mounting portion and the connecting portion are substantially flat sheets; the limiting arced slot is defined in the connecting portion and is arc-shaped.

14. The hinge assembly of claim 10, wherein the positioning member further forms a blocking protrusion at a periphery; the rotatable joint defines a latching slot extending substantially parallel to an axis of the shaft; the blocking protrusion is non-rotatably and slidably engaged in the latching slot.

* * * * *